United States Patent [19]

Storace et al.

[11] Patent Number: 4,787,045

[45] Date of Patent: Nov. 22, 1988

[54] POSTAGE METER RECHARGING SYSTEM

[75] Inventors: Anthony Storace, Norwalk, Conn.; Donatas V. Gasiunas, Carmel, N.Y.; Albert V. Yannella, Milford, Conn.

[73] Assignee: Pitney Bowes Inc., Stamford, Conn.

[21] Appl. No.: 850,476

[22] Filed: Apr. 10, 1986

[51] Int. Cl.[4] .......... H04L 9/00

[52] U.S. Cl. .......... 364/464.02; 364/466; 380/23

[58] Field of Search .......... 364/466, 464, 900; 235/375, 382, 382.5; 380/23

[56] References Cited

U.S. PATENT DOCUMENTS

| | | | |
|---|---|---|---|
| 4,097,923 | 6/1978 | Eckert et al. | 364/466 |
| 4,285,050 | 8/1981 | Muller | 364/900 |
| 4,376,299 | 3/1983 | Rivost | 380/23 |

FOREIGN PATENT DOCUMENTS

| | | | |
|---|---|---|---|
| 8605611 | 9/1986 | PCT Int'l Appl. . | |
| 947991 | 1/1964 | United Kingdom . | |
| 953999 | 4/1964 | United Kingdom . | |
| 1119610 | 7/1968 | United Kingdom . | |
| 2147853 | 6/1985 | United Kingdom | 364/466 |
| 2174039 | 10/1986 | United Kingdom . | |

*Primary Examiner*—Parshotam S. Lall
*Assistant Examiner*—Ellis B. Ramirez
*Attorney, Agent, or Firm*—Michael J. DeSha; David E. Pitchenik; Melvin J. Scolnick

[57] ABSTRACT

An electronic postage meter system in which a postage meter is coupled to a data center by way of a communication path, to enable recharging of the accounting register of the postage meter under the control of the data center. The postage meter includes an arrangement for applying dialing signals to the communication path for initiating a request for recharging of the postage meter register, and for interrupting the communication prior to the receipt of recharging authorization. The data center is responsive to a request for recharging the postage meter register to apply dialing signals corresponding to the expected location of the postage meter to the communication path to re-establish communication for the transmission of recharging authorization signals. The interruption and subsequent re-establishment of communication verifies the continued location of the postage meter at the expected location.

18 Claims, 6 Drawing Sheets

REMOTE ACCOUNTING DATA CENTER

POSTAGE METER RECHARGING SYSTEM

FIELD OF THE APPLICATION

The present invention relates to a postage meter recharging system and to a postage meter adapted for such recharging.

BACKGROUND OF THE INVENTION

Postage meter devices have found wide application in many businesses. The device prints a standard unit of value for governmental or private carrier delivery of parcels and mail. It is understood that the term "postage meter" also includes other like devices which provide a unit value metering capability.

One of the chief disadvantages of the postage meter devices as they are utilized today is the problem of recharging the postage meter with funds to be metered. At present, postal regulations required that the funds be prepaid before metering commences. This requirement results in a postage meter being physically taken to a post office facility for recrediting or there being means for obtaining a remote recrediting of the meter device.

Various schemes have been devised and implemented to obtain the desired remote recrediting based on information from a remote accounting station. Typical configurations are shown in U.S. Pat. No. 3,792,446 to McFiggans, et. al. entitled "REMOTE POSTAGE METER RESETTING METHOD" and in U.S. Pat. No. 4,097,923 to Eckert, Jr., et. al. entitled "POSTAGE METER CHARGING SYSTEM USING A ADVANCED MICROCOMPUTERIZED POSTAGE METER." These patents teach a data center which is equipped with a programmed digital computer and a voice answer-back unit to process telephone calls from users of postage meters equipped either with a combination lock such that the lock prohibits recharging of the associated meter until it is unlocked or, in the case of U.S. Pat. No. 4,097,923, of a working memory which contains a seed number for generating postage funding combinations to unlock the meter. The remote system of the latter patent includes the capability of adding variable amounts of postage to the postage meter. The teaching of U.S. Pat. No. 3,792,446 relate only to the addition of a fixed increment to the meter.

U.S. Pat. No. 3,255,439 to Simjian discloses a system in which the meter communicates directly to a central accounting station for accounting for each and all of the metering operations either on a real time basis or in batches. Similar systems are disclosed for instance in West German patent application No. DE 2636852 published Feb. 23, 1978 in which a data transmitting unit is employed to recharge the postage meter by way of telephone or telegraph lines. U.K. application No. 2,147,853 published May 22, 1985 further discloses a telephone integrated with a mail franking device which will operate as either a telephone or a postage meter. The telephone key pad may be used to set postal values and it is disclosed that the accounting may be done either in the device or in a central accounting unit.

Each of the devices is limited in that there are required a number of complex operations in order for the user of the postage meter to assure that there are funds in the meter to be dispensed. In every case in the known postage meters, where the meter funds are required to be updated, it is up to the user to realize that the funds in the meter are low and that the user should initiate a telephone call or take the meter to the Post Office in order to recredit the meter. In many cases, a low funds event may occur as the user is in the midst of a mailing run. Because the prior art devices typically have a lockout feature to prevent meter operation when the funds get too low, the user is unable to continue with postage metering operations. In such cases, the user experiences dissatisfaction because one of the reasons for utilizing the remote recharging features of the postage meter is to eliminate the problem of having to go to the Post Office and to be able to obtain postage as needed.

SUMMARY OF THE INVENTION

In accordance with the invention, a postage meter monitors the funds remaining in its descending register and whenever the value reaches a predetermined level, an automatic dialing device establishes communication to initiate a funds transfer. An account corresponding to the postage meter is maintained at a remote accounting data center such as a bank. Once communication to the remote accounting center is established, the account of the postage meter user is verified to assure that sufficient funds are available for transfer to the postage meter. In the event that the account is verified as proper, a signal, preferably recrediting data encrypted to prevent fraud, is transmitted to the postage meter to update the credit register. Preferably, the predetermined threshold is selectable by the user to match his expected use of postage. For best results, the meter stores the signal indicating the necessity for recrediting of the register and communicates during an offpeak period such as nighttime when the cost of telephone communications are lower and when the data center can be expected to ecounter much less demand on its facilities. The calls from various postage meters may be staggered in order to avoid overloading the system. To ensure the integrity of the recharging operation, provision is made upon calling the data center to ascertain the identity of the calling meter location and then to break the connection and for the data center to immediately redial the location. Upon connection the meter at the called location is polled for identification and the responding code compared with the prestored identity of the meter at such location. In response to verification, the meter funding register is then activated as described above. These verification operations take place in a manner requiring no user intervention and thus are completely transparent to the user.

Preferably, the communications are established through a telephone exchange utilizing dual tone multifrequency generators and receivers for decoding the data communicated between the meter and remote accounting center. It will be understood that conventional communication through MODEM connections are also contemplated. For best results, the data is encrypted in both directions in order to block fraudulent attempts to recredit the register.

Several additional features are appropriately employed within the forgoing concepts. The keyboard includes a HELP button or key which may be employed to establish oral contact with the data center for voice communication. If funds are low, the use of the help key can porovide automatic refunding of the meter. Power monitoring is provided for lockout if the meter is without power for an excessive period of time, and can require the meter to undergo reinitialization thereafter. With respect to rate changes, the data link established with the data center can be employed to update the meter internal rate schedule as rates are updated. This feature can be established via an automatic rate scan for updating each time the meter accesses the data center or during certain select time frames when the data lines are available. This can be done by virtue of initiation by the meter or by the data center.

It is therefore an object of the invention to provide a postage meter recharging system that is transparent to the postage meter user. It is a further object to provide a postage meter recharging system which will provide communication with the data center at a lower cost to the postage meter user and at a predetermined level of funds in the meter, preferably selectable by the user.

It is another object to provide a postage meter recharging system in which the location of the calling meter may be checked and verified in a manner transparent to the user.

DESCRIPTION OF THE DRAWING

In order that the invention will be more clearly understood, it will now be disclosed in greater detail with reference to the accompanying drawings wherein.

DESCRIPTION OF THE PREFERRED EMBODIMENT

Figure 1:
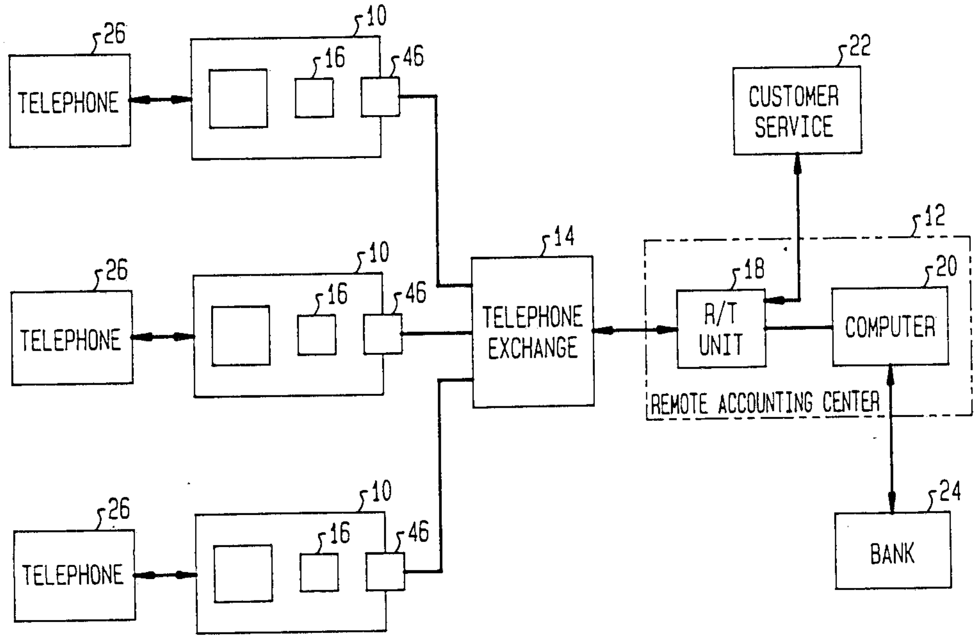
FIG. 1 is a block diagram of a postage meter recharging system in accordance with the invention.

Referring now to FIG. 1, a schematic block diagram of the remote meter funding system of this invention is shown. A plurality of blocks 10 represent postage meter stations capable of communicating with a data center or remote accounting station represented by block 12. The postage meter stations communicate with remote accounting center 12 via telephone exchange equipment generally illustrated by block 14. The transmitter-receiver 16 at each station 10 is preferably a DTMF generator-receiver combination such as for example, Motorola MC 14410 DTMF Generator and GTE G8870A DTMF Receiver.

Data center 12 includes a similar generator-receiver shown at 18. This generator-receiver 18 will receive frequency encoded data input from the transmitter-receiver combination 16 at any of the stations 10 and transform this input into a suitable, machine language for a programmed or special purpose digital computer 20. The computer 20 may be, for example, a Data General "Nova". The computer in turn communicates back to the particular postage meter station 10 via the communication line established, by the telephone exchange equipment. It will be appreciated that communication between each postage meter station and the remote accounting center could be by way of a MODEM as is well known in the art of computer communication.

The data center 12 is shown in conjunction with a customer service facility 22 for providing human communication, if required, to the user of the postage meter station 10 in order to provide help or information. In one embodiment of the charging system in accordance with the invention, the data center 12 may be in communication with a remote banking facility 24 to provide a funds transfer between an account maintained at the banking facility 24 and the remote accounting center 12. Typically, the postal meter station 10 will be used in conjunction with a conventional telephone handset 26 coupled thereto.

Figure 2:
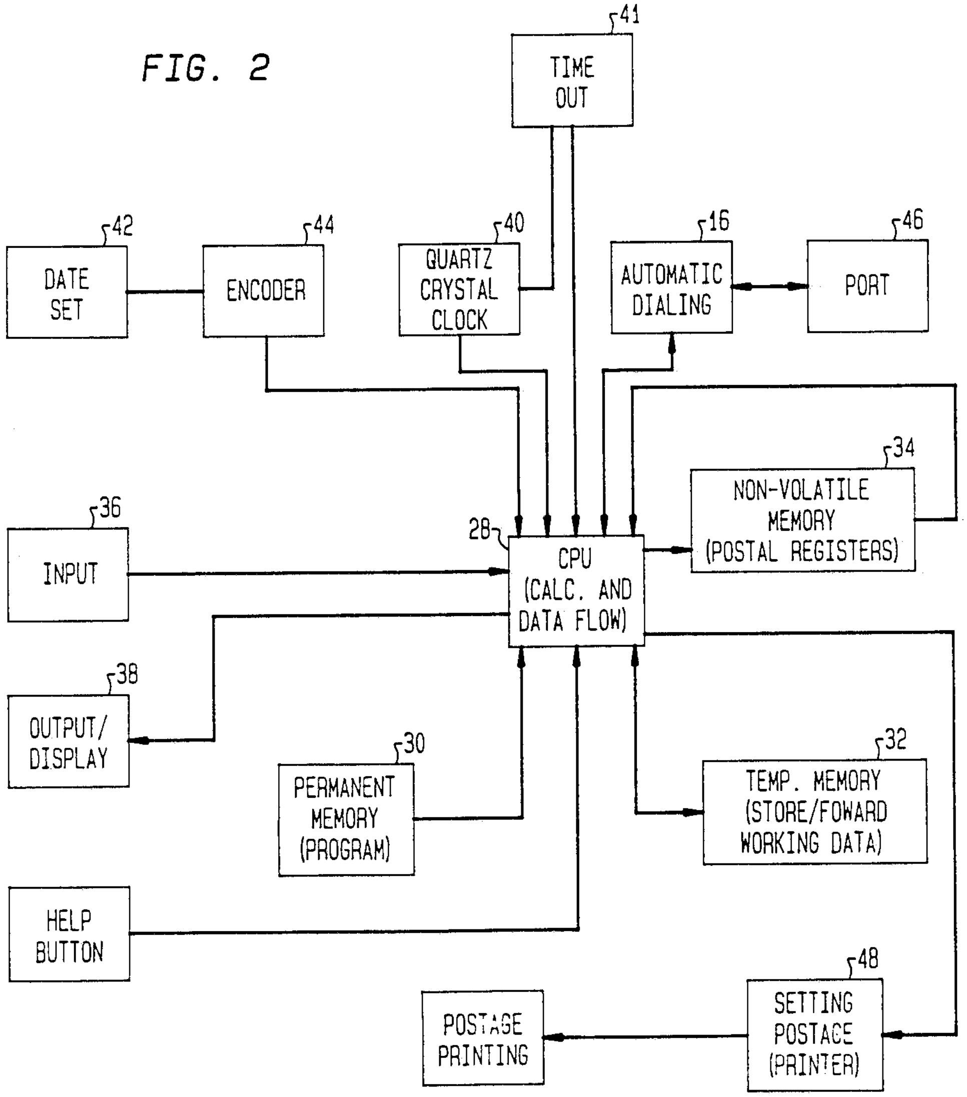
FIG. 2 is a block diagram of a postage meter in accordance with the invention.

Referring now to FIG. 2, the general functional arrangement of the computerized postage meter station 10 of the present invention is illustrated.

Electronic postage meters are known and are described, for instance, in U.S. Pat. No. 3,978,457 for MICROCOMPUTERIZED ELECTRONIC POSTAGE METER SYSTEM and in U.S. Pat. No. 4,301,507 for ELECTRONIC POSTAGE METER HAVING PLURAL COMPUTING SYSTEMS, the disclosures of which are specifically incorporated by reference herein.

The heart of the system is the CPU or microprocessor 28 and it performs two basic functions: performance of calculations based on input data and controlling the flow of data between various memory units. Three basic memory units are employed with the CPU 28. The first is the ROM or permanent memory 30 which as is well known is a non-alterable memory storing the specific sequence of operations for performing postal data calculations in accordance with certain predetermined inputs as well as performing other routines for operating the system. The second memory unit is a temporary memory, RAM 32 which interacts with the CPU 28 for forming a temporary storage, holding and forwarding working data in accordance with the calculations being performed by the CPU 28. An additional memory component, NVM 34 which may be a battery backed RAM or other memory capable of long term storage of data is also coupled to the CPU 28. It will be understood that the data calculation may be performed and stored in battery backed RAM or an appropriate NVM of other known types. The NVM 34 is a non-volatile memory which acts to store certain critical information employed in the postal system. Information stored in the temporary memory 32 which represents crucial accounting functions such as descending balances in a descending register or ascending credits in an ascending register and the like are stored in the nonvolatile memory 34 wherein they may be held while the machine is deenergized and then recalled upon a subsequent start-up. In this manner, the computer system may continually act upon these balances in the temporary memory 32 without fear of loss of this information upon shutdown.

Further the information may be recalled on reactivation by start-up by retrieving it from the nonvolatile memory 34. The nonvolatile memory is shown as coupled to the CPU and deriving an output therefrom in accordance with the transfer of information from the temporary storage 32 under the control of the permanent memory 30 through the CPU 28. The nonvolatile memory 34 is also shown as providing an output line coupled back into the CPU 28 for transferring the data back into and through the CPU 28 and into the temporary memory 32 in accordance with the start-up routine under the control of the permanent memory 30.

The system operates in accordance with data applied from an appropriate input means 36. It will appreciated that the input means may include mechanical print value setting devices and switches in place of or in addition to a keypad. This data is fed into the CPU 28 under control of the program in the permanent memory 30. At any time during the operation of the system, the contents of the temporary memory 32 storing the appropriate credit, debit, balances, or other accumulations in accordance with the various features of the system could be made available by an appropriate instruction provided by the input means 36 or communicated to the meter. This causes the CPU 28 to access the desired location in temporary memory 32, thereby storing the information requested. The information may also be provided through the CPU 28 into the output display unit 38.

Further in accordance with the invention, there is shown a clock 40 connected to the CPU for the purpose of providing time and date information to the CPU. Such clocks are well known and may comprise for instance an LSI logic circuit in combination with a quartz-crystal controlled oscillator. In connection therewith, there is provided a timeout device 41 coupled to the clock 40 and the CPU 28. The timeout device operates to measure the time during which the meter is without power. Since the meter of the present invention is designed to be operative only at one specific location, it is assumed that an inordinate time without power may be indicative of an attempt to change the location of the meter. The use of the timeout signal will be explained further below. The dater wheels indicated at 42, which are typically positioned manually, have encoders 44 coupled thereto which provide date wheel positioning information to the CPU. A suitable arrangement is shown for example in U.S. Pat. No. 4,060,720 to Check specifically incorporated by reference herein.

As previously described with respect to FIG. 1, a DTMF Transmitter and Receiver combination 16 is coupled to the CPU and to an output port 46 for establishing communication and for communications between the remote accounting center and the CPU under the control of the CPU or the remote accounting center.

Figure 3:
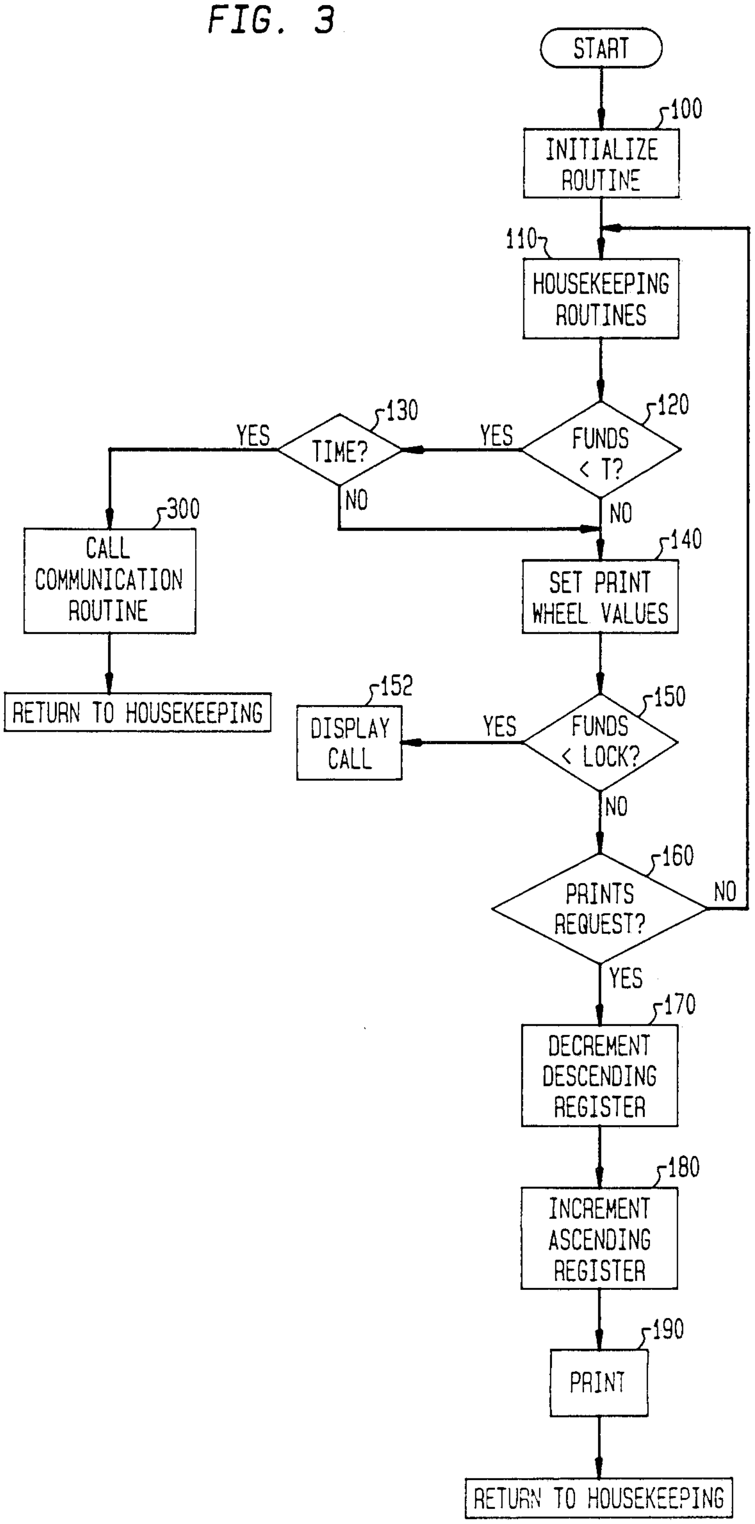
FIG. 3 is a flow chart of the operation of the postage meter.

FIG. 3 illustrates in a flow chart the operation of a postage meter in accordance with the invention. Once the postage meter station 10 is installed, the meter program proceeds through its initializing routines shown at block 100. Thereafter as described more fully below the meter will continuously loop through its routines to check meter parameters and input conditions and to print postage as desired by the user.

As shown in block 110 the meter program proceeds through housekeeping routines such as those described for instance in U S. Pat. No. 4,301,507 previously incorporated by reference for monitoring various meter conditions. One additional meter condition checked in accordance with the invention herein relates to the status of timeout block 41 shown in FIG. 2. Thus, if a preset length of time has elapsed during which the meter was without power, the housekeeping circuit will, upon sampling the timeout conditions, initiate a call to the remote accounting location to provide an appropriate claim. Alternatively this condition can be used to effect a meter lock-out, requiring the user to bring the meter into the Post Office or the like. The routine also prooeeds to decision block 120 to check whether the funds in the descending register have been decremented to a predetermined threshold level. Preferably this threshold level is set in accordance with the user's desires. This may be accomplished either through preset values in the program stored in ROM or through communication between the installed meter and the remote accounting center.

Figure 4:
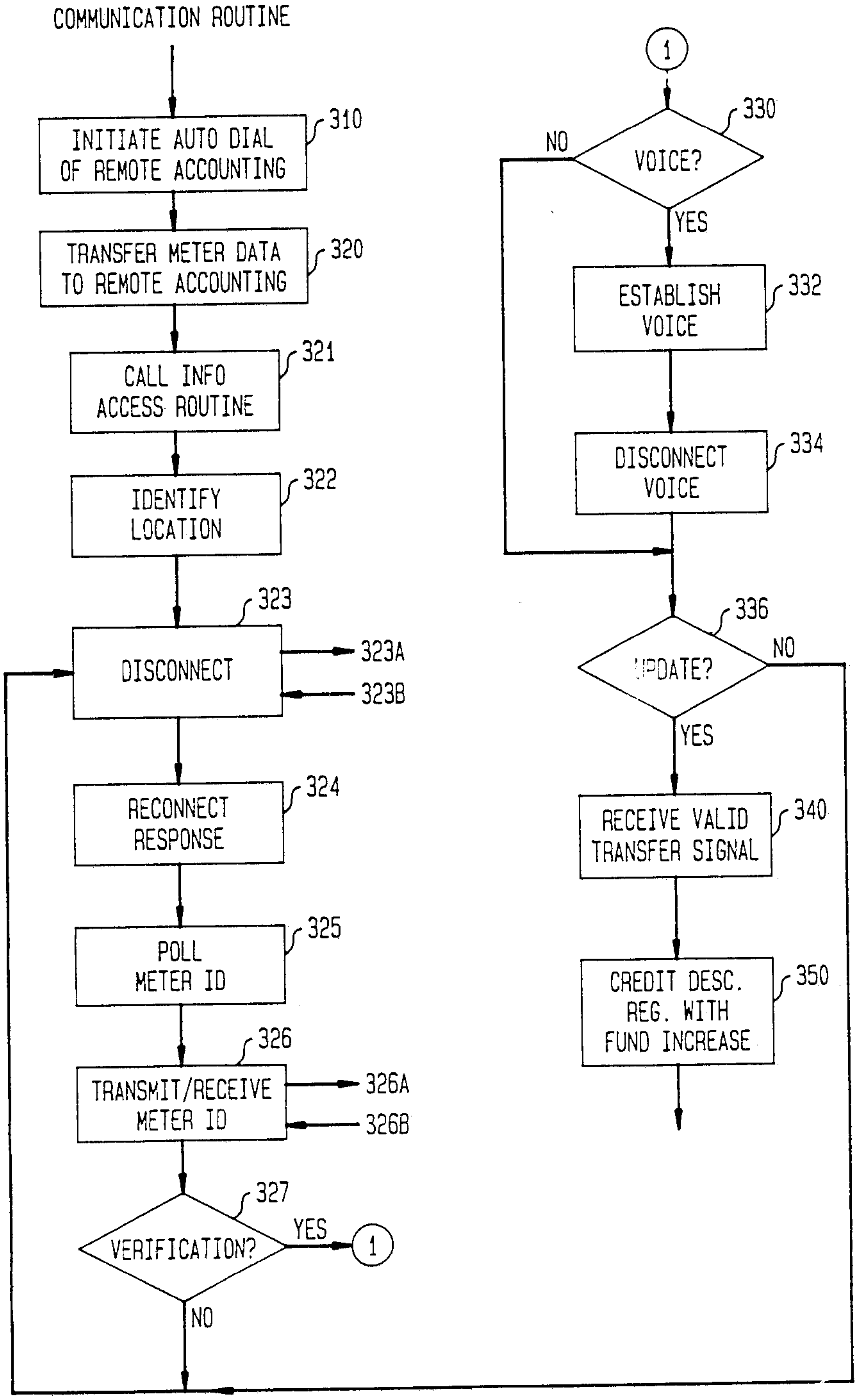
FIG. 4 is a flow chart of a communication routine for establishing communication between the postage meter and the remote accounting center.

If the threshold funds value has been reached, the routine further checks decision block 130 to determine if a predetermined time has been reached. If the time is appropriate, the communication routine shown as block 300 and described in conjunction with FIG. 4 is called and communication is established at port 46 through the telephone exchange to the remote accounting center 12. It will be appreciated that it is preferable that the calls which may be made to the remote accounting center be staggered in order that the center be able to accommodate the various postage meter stations. Accordingly the predetermined intervals may preset in the permanent program memory or may be downloaded to the postage meter station at the initial communication between the postage meter and the remote accounting center.

If however the threshold value has not been reached or the threshold was reached and funds have been recredited to the meter, the program proceeds to block 140 which is a routine to set print wheel value (in conjunction with block 48, FIG. 2). Typically the print wheels wlll remain set at the previously selected value since the majority of letters will probably not weigh more than that requiring the minimum postage. Known electronic postage meters conventionally use stepping motors for the purpose of setting the print wheels to a value commanded from a keyboard. The block 140 will also be understood to encompass the manual selection of printwheel positions through mechanical coupling between the setting means and the print wheels and the verification of each print wheel position.

At decision block 150 the value stored in the descending register is compared to a meter lockout value to determine for instance whether there are funds available for metering even though the predetermined recrediting threshold has been reached. If the meter lockout point has been reached the program branches to block 152 to display a message to the user, for example, "CALL CUSTOMER ASSISTANCE" or the like. When funds remain, the program decision block 160 checks to see if a postage printing has been commanded. If no printing has been initiated, the program loops back. If a print cycle has been requested, the descending register is decremented and the ascending register is incremented as illustrated in blocks 170 and 180. The program moves to block 190 where the printer prints the selected postal value and the program returns to block 110.

FIG. 4 is a flow chart of a communication routine called by the postage meter program in the event that funds in the descending register have been decremented to the previously set threshold value. The routine 310 signals the DTMF transmitter-receiver 16 to dial the preselected telephone number of the remote accounting center 12 and establishes communication between the postage meter and the remote accounting center. It will understood that various "handshaking" procedures are well known and may be utilized for establishing valid communication. Suitable protocols are described in U.S. Pat. No. 4,253,158 specifically incorporated herein by reference and in previously cited U.S. Pat. No. 4,097,923. As shown in block 320 the program falls to a transmit meter data information block. It will be appreciated by those skilled in the art that all of the required meter data can be transmitted to the remote accounting center in a group of tone signals or the information may be transmitted piecemeal in response to queries from the computer in the remote accounting center.

At this point of the routine the meter identification system and communication protocols are established. In concept, identification signals are applied to the communication port means, said dialing signals corresponding to a data center, interrupting communication via said communication port means following the application of said dialing and identification signals thereto, and responding only to the receipt of dialing signals corresponding to said communication path means for enabling said modifying of the contents of said register.

Thus, the calling signal is polled in accordance with the program block 321 through an appropriate register located within the meter for the purpose of identifing the location of the meter by virtue of its transmitting telephone number. This identification is contained in appropriate data signals and transmitted in accordance with the instructions at program block 322. This location information may be provided in one of several ways. The transmitting location telephone number may simply be contained within the appropriate register of the meter and transmitted in response to the control block 321 of the program which provides appropriate information routing. A further technique which may be utilized in lieu of the foregoing or which may be utilized in addition to the foregoing will employ devices such as those conventionally utilized at the central telephone company switching stations which can automatically provide the identity of the calling telephone number. Thus, the identity of the transmitting telephone number may be maintained or identified with the use of appropriate circuitry through the use of the telephone central switching office and compared to the transmission of the telephone number of the meter as precontained within the meter as noted above to ascertain that the actual originating telephone number and the meter transmitted telephone number are in fact the same. In either case, the location identity is at that point transmitted to the remote accounting means. At this point, the remote accounting means takes control of the program and disconnects the telephone connection between the remote accounting and the local postage meter. Immediately thereafter, the remote accounting routine program redials the telephone number which had previously been identified as the calling telephone number, and connection reestablished. Thus, upon transmission of the identity location of the local meter from block 322, block 323 undertakes the disconnection of the telephone link betwen the local station and the remote accounting station. Immediately thereafter, reconnection is established by setting the appropriate MODEM connection into its answer mode in the local unit and at program block 324, a reconnection is established. Upon reconnection, the remote accounting routine provides an appropriate calling signal which is interpreted in program block 325 as a request to transmit a meter identification number. Meter identification, provided by program block 326, is transmitted to the remote accounting location along line 326A. Decision block 327 then determines whether or not a verification has been made. If verification has been made, a verification signal is transmitted back from the remote accounting routine along line 326B. If no verification signal is made, then a signal is provided from decision block 327 to enable the disconnect circuit 323, thus breaking the link between the postage meter and remote accounting location. If verification is made, then the program continues to program block 340.

For best results the recrediting information transmitted by the remote accounting center to the postage meter must be encrypted to prevent fraudulent register updates being sent to the meter by unscrupulous parties. Accordingly, the block 340 also includes a routine for decrypting data that has been encrypted by the computer in the remote accounting center for transmission to the particular individual postage meter. A suitable encryption scheme is described for example in U.S. Pat. No. 3,792,446 specifically incorporated herein by reference.

Upon assuring that the meter has received proper and authentic register recrediting information from the remote accounting center, the program performs the update of the descending register at block 350 and returns to the main program illustrated in FIG. 3.

Figure 5:
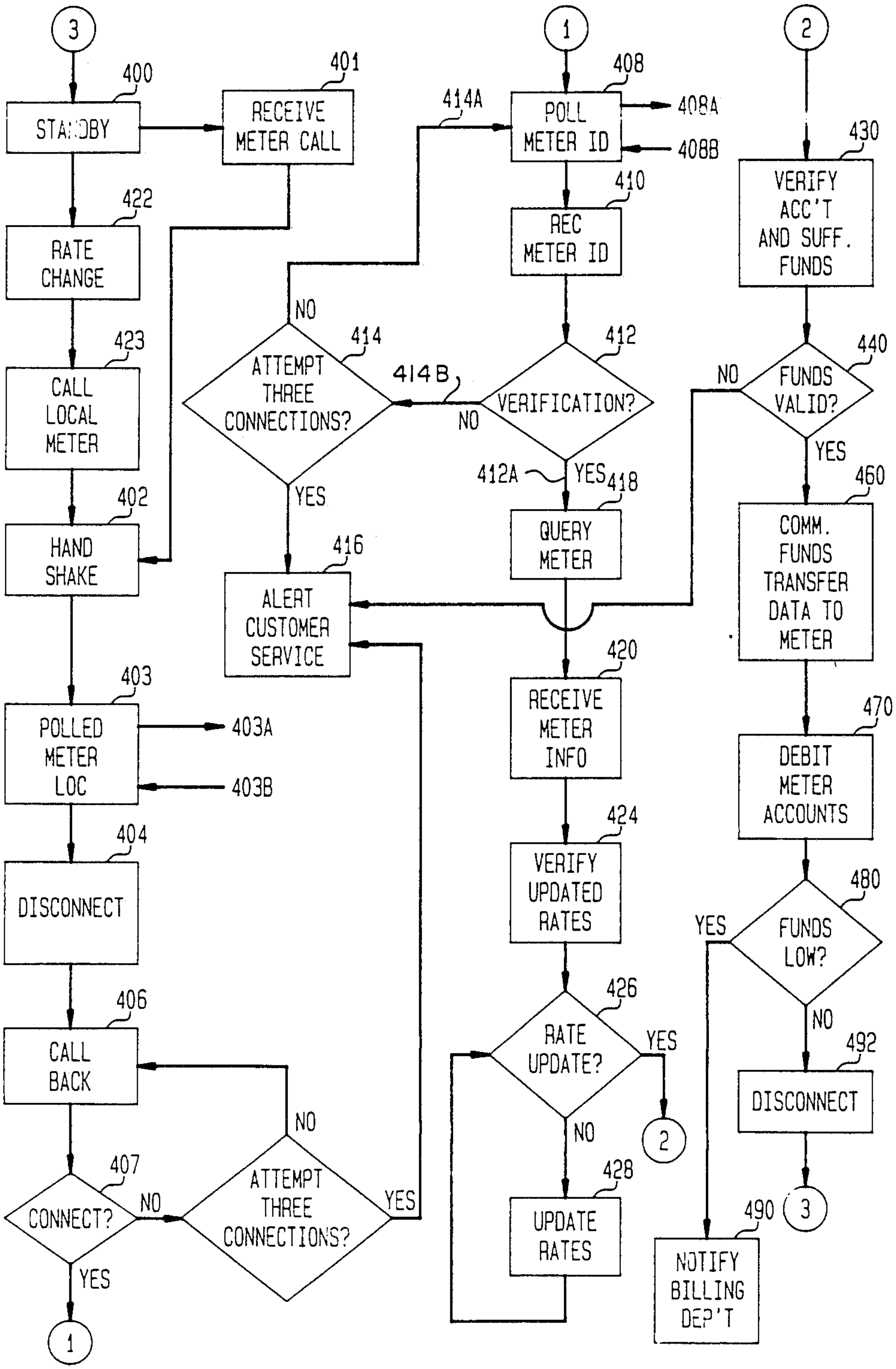
FIG. 5 is a flow chart of the operation of the equipment at the remote accounting data center.

FIG. 5 is a flow chart illustrating the sequence of operations carried on at the remote accounting center upon communication being established between the postage meter and the accounting center. The center normally operates in a standby mode, block 400. The instant routine is initiated by a telephone connection being established between the postage meter and the remote accounting center, block 401. The communication protocols are established by "handshake", achieved in block 402. Once the communication is established, the program then falls to block 403 wherein a meter identification signal request is provided along line 403A to the local meter location. In response to this identification request, a signal is returned along line 403B specifically identifing the meter location, as by its local telephone number. Immediately thereafter, the program falls to block 404 where a disconnect is initiated, thereby breaking the telephone link between the local meter and the remote accounting location. Program sequence next falls to block 406 where call back is initiated along the appropriate MODEM connections. If no connection is established, reconnection is attempted by an indication from decision block 407 attempting a reconnection through the call back program step 406. As indicated, by way of example, three attempts are made to initate the call back routine. Failure to initiate the call back routine after three attempts terminates the attempt to call back and appropriate information is provided to the billing department for troubleshooting or generating an alarm condition to ascertain the reason for the difficulty with the connection. If the decision block 407 indicates an appropriate connection has been made, then the program falls through to blook 408 where a meter polling signal is provided from the remote accounting unit. The meter polling signal is provided aiong a line 408A for transmission across the telephone link. The appropriate response received along line 408B is then passed through the block 410 for analysis and verification. Failure to verify is indicated by the decision block 412 and passes through the second decision block 414 for a three time attempt to reverify. Thus, failure to verify provides a signal along the line 414A which reinitiates the polling signal routine in block 408, thereby repeating the prior operations. Three attempts are made to reestablish proper meter identification. Failure to establish proper meter identification after three attempts provides an output signal along the line 414B which is conducted to an alarm block 416 for appropriate action by the remote accounting location.

Upon indication of a proper response, line 412A provides an indication thereof and the program falls to block 418 to request the meter to transmit meter data to the computer. The circled numbers on the flow chart indicate common connections. The data to be received in block 420 includes at least the values in the descending and ascending registers in the meter. The keyboard includes a HELP button or key which may be employed to establish oral contact with the data center for voice communication. If funds are low, the use of the help key can provide automatic refunding of the meter. The help button is shown in FIG. 2. Appropriate software routines are provided to monitor the status of this key and in response thereto actuate the voice link or the funds transfer routine. In the communication routine of FIG. 4, the meter system tests for voice after decision block 327. After disconnect, update is verified and if not required the system disconnects. In FIG. 5 the software includes a block 417 which tests to see if the voice link is required, as where the funds condition is not below the threshold limit. After termination of the voice link the routine falls to block 492 where the system disconnects and returns to standby mode.

A further feature utilized by the system of the present invention allows for rapid and reliable updating of rate changes in a manner transparent to the user. Thus, upon initiation of a rate change by postal authorities, involving either postage or other aspects of postal meter operation, such as rate changes utilizable in a scale, and with reference to FIG. 5, program block 422, preceding a rate change, initiates a telephone call to the local meter block 423 through hand shake block 402. The timing of such calls can be preset in accordance with a predetermined allowable telephone call timing. The confirmation of a connection is recognized in decision block 407 and a meter identification procedure described above is initiated. Thereafter, as part of the analysis of existing meter information, and with reference to decision block 424, verification is checked with respect to meter information received in response to block operation 420 to verify that the updated rates are present or not present in the meter. This decision is verified in decision block 426. If the meter rates have not been updated, then program block 428 comes into operation and the meter rates are updated. The program then falls to the next block 430, and the program proceeds as described below. If meter rates have been updated, then decision block 426 causes the program to fall to a decision block 430 directly without passing through program block 428. It should be noted that the verification of update rates occuring in program block 424 will occur each time the meter receives a recharge request since the the program steps 424, 426 and 428 are placed within the program sequencing taking place after the meter as responded to a correct identification. The self initiation of the rate change operation occuring in block 422 is an independent operation occuring within the remote accounting data station and operates independently of a local meter request. In either case, verification of rate update takes place, thereby insuring that the rates being employed in the postage meter would be the most current rates each time the meter is used. It should be noted that although reference has been made to postage meters, the forgoing operation will equally applied to a system employing a scale employed for postage determination, even in instances where a postage is not issued by the local device. Thus, the updating accounting routine indicated in FIG. 5 may be equally applicable to a remote scale, and can respond according to remote scale input information requests to the same extent that a postage meter may similarly be programmed to generate and respond to rate changes. It is not the intention of the present invention to be limited to postage meters with respect to initiation and operation of rate changes but rather these features would be understood by one skilled in the art to be generally applicable to all such devices wherein downloading of rate changes from a central data station is a desirable feature. Power monitoring is provided for lockout if the meter is without power for an excessive period of time, and can require the meter to undergo reinitialization thereafter.

With respect to rate changes, the data link established with the data center can be employed to update the meter internal rate schedule as rates are updated. This feature can be established via an automatic rate scan for updating each time the meter accesses the data center or during certain select time frames when the data limes are available. This can be done by virtue of initiation by the meter or by the data center.

After updating, the computer then proceeds, block 430, to verify that the account is valid and that sufficient funds are available. In decision block 440, if funds are not available, the program branches to block 416 to alert customer service that there are no funds for transfer to this particular meter. Assuming that there are sufficient funds, funding register update information, preferably encrypted as described above, is transmitted to the meter via the telephone connection, block 460. The user account is debited, block 470, and if the funds available have reached a predetermined threshold level. decision block 480, customer billing is notified, block 490. If there is no low funds condition, the data center returns to standby mode.

Figure 6:
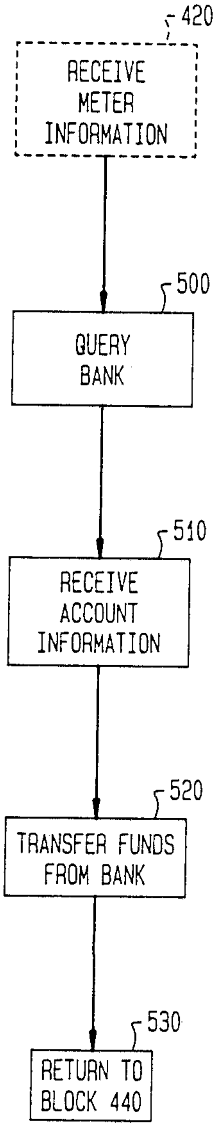
FIG. 6 is a flow chart of an alternate method of operation.

FIG. 6 shows an alternative method for maintaining the user's account. In accordance with this method the user's funds are maintained in a fund in a bank. Whenever the postage meter is to be recredited, the user's account is verified and the postage meter recrediting information is transmitted. The funds to cover the recrediting are transferred from the bank to the remote accounting center, block 520. The advantage of this arrangement is that the user's funds can be drawing interest instead of being tied-up in the account for directly funding the meter.

This application incorporates certain material common to certain other applications. The subject matter of all of these applications is incorporated herein by reference. The applications are identified as follows by Ser. No. and title: Ser. No. 850,479 and entitled POSTAGE METER RECHARGING SYSTEM, Ser. No. 850,478 and entitled POSTAGE METER COMMUNICATION SYSTEM, Ser. No. 850,477 and entitled POSTAGE METER RECHARGING SYSTEM, and Ser. No. 850,480 and entitled POSTAGE METER MESSAGE PRINTING SYSTEM.

Other variations and modifications will be apparent to those skilled in the art.

What is claimed is:

1. In an electronic postage meter having an external communication port means, an accounting circuit including a descending register, communication control means coupled to said accounting circuit for applying dialing signals and coded identification signals to said communication port means, said dialing signals corresponding to a data center, said control means comprising means responsive to determined coded signals from said port for modifying the contents of said register to correspond to a determined higher postage printing value authorization; the improvement wherein said control means comprises means for interrupting communication via sid communication port means following the application of said dialing and identification signals thereto, and means responsive to the receipt of dialing signals after the interruption for said modifying of the contents of said register.

2. In an electronic postage meter having an external communication port means, an accounting circuit including a funding register, communication control means coupled to said accounting circuit for applying dialing signals and coded identification signals to said communication port means, said dialing signals corresponding to a data center, said control means comprising means responsive to determined coded signals from said port for modifying the contents of said register to correspond to a determined higher postage printing value authorization; the improvement wherein said control means comprises means for interrupting communication via said communication port means following the application of said dialing and identification signals thereto, means for determining the originating communication control means location, and means for verifying the presence of said postage meter at said location.

3. The meter of claim 2, wherein said meter includes means for modifying the contents of said register in response to said verification.

4. In an electronic postage meter having an external communication port means, an accounting circuit including a descending register, communication control means coupled to said accounting circuit for applying dialing signals and coded identification signals to said communication port means, said dialing signals corresponding to a data center, said control means comprising means responsive to determined coded signals from said port for modifying the contents of said register to correspond to a determined higher postage printing value authorization; the improvement wherein said control means comprises means for interrupting communication via said communication port means following the application of said dialing and identification signals thereto, and means responsive only to the receipt of dialing signals corresponding to said communication path means for enabling said modifying of the contents of said register.

5. In an electronic postage meter having an external communication port means, an accounting circuit including a descending register for storing funding data corresponding to a postage value which said meter is authorized to print, and communication control means connected to said port and applying thereto dialing signals corresponding to a data center and coded information signals that incorporate meter identification data and data corresponding to said funding data, said control means being responsive to the receipt of determined coded signals at said port means for increasing the value of postage that the meter is authorized to print, said meter having connection means for connecting of the meter to a source of power for operating circuts of the meter; the improvement wherein said meter comprises sensing means for sensing the application of power to said connection means, and time delay means responsive to the absence of the application of power to said connection means for a determined period of time for disabling said meter from any further printing of postage.

6. In a postage meter system including an electronic postage meter, a data center, and a communication path interconnecting said meter and path, said meter comprising an accounting system including a register for storing data corresponding to the amount of postage which said meter is authorized to print, and communication control means for establishing a data interconnection between said meter and center via said path and applying coded signals to said path including signals identify in said meter and signals corresponding to the contents of said register, said communication control means further comprising means responsive to the receipt of determined coded recharging signals via said communication path for modifying the contents of said register to correspond to an increase in the amount of postage which said meter is authorized to print, said data center comprising means for verifying said coded information signals and in response thereto applying said recharging signals to said path, the improvement wherein said control means further comprises means for interrupting the interconnection between said meter and said data center upon the application of said coded information signals to said path and before the receipt of recharging signals from said path, said data center comprising means responsive to the receipt and verification of said coded information signals for reestablishing the interconnection between said meter and data center.

7. The postage meter system of claim 6 wherein said postage meter is at a remote location having a telephone, said communication path comprises a telephonic communication path, said means for establishing a data interconnection comprises means for pplying dialing signals to said path corresponding to the telephone number of said data center, and said means for reestablishing the interconnection comprises means for applying dialing signals to said path corresponding the telephone number of said telephone, whereby said meter can be recharged only if it is located at said remote location.

8. The postage meter of claim 7 wherein said control means comprises nonvolatile memory means having stored therein a telephone number corresponding to said remote location, and means applying said stored telephone number to said path with said coded signals, said means for applying dialing signals to said path corresponding to said telephone number comprising means for recovering said stored telephone number from said coded signals, and means for applying said stored telephone number to said path in the form of dialing signals.

9. The postage meter of claim 7 wherein said postage meter further comprises releasable power connector means for applying operating power thereto via a main supply, and time delay means responsive to the absence of power at said connector means for a determined time for inhibiting said meter from any further printing of postage, whereby separation of said meter from said remote location prevents the meter from any further printing of postage.

10. The method of operating an electronic postage meter system having an external communication port means, an accounting circuit including a descending register, and communication control means coupled to said accounting circuit, comprising the steps of applying dialing signals and coded identification signals to said communication port means, said dialing signals corresponding to a data center, interrupting communication via said communication port means following the application of said dialing and identification signals thereto, and responding to determined coded signals from said port for modifying the contents of said register to correspond to a determined higher postage printing value authorization.

11. The method of operating an electronic postage meter system having an external communication port means, an accounting circuit including a funding register, and communication control means coupled to said accounting circuit, the improvement comprising the steps of applying dialing signals and coded identification signals to said communication port means, said dialing signals corresponding to a data center, interrupting communication via said communication port means following the application of said dialing and identification signals thereto, determining the originating communication control means location, and verifying the presence of said postage meter at said location.

12. The method of claim 11, including modifying the contents of said register in response to said verification.

13. The method of operating an electronic postage meter system having an external communication port means, an accounting circuit including a descending register, and communication control means coupled to said accounting circuit, the improvement comprising the steps of applying dialing signals and coded identification signals to said communication port means, said dialing signals corresponding to a data center, interrupting communication via said communication port means following the application of said dialing and identification signals thereto, and responding only to the receipt of dialing signals corresponding to said communication path means for enabling said modifying of the contents of said register.

14. The method of operating an electronic postage meter system having an external communication port means, an accounting circuit including a descending register for storing funding data corresponding to a postage value which said meter is authorized to print, and communication control means connected to said port and applying thereto dialing signals corresponding to a data center and coded information signals that incorporate meter identification data and data corresponding to said funding data, said control means being responsive to the receipt of determined coded signals at said port means for increasing the value of postage that the meter is authorized to print, said meter having connection means for connecting of the meter to a source of power for operating circuits of the meter; the improvement comprising the steps of sensing the application of power to said connection means, and responding to the absence of the application of power to said connection means for a determined period of time for disabling said meter from any further printing of postage.

15. The method of operating an electronic postage meter system including an electronic postage meter, a data center, and a communication path interconnecting said meter and path, said meter comprising an accounting system including a register for storing data corresponding to the amount of postage which said meter is authorized to print, and communication control means for establishing a data interconnection between said meter and center via said path and applying coded signals to said path including signals identifying said meter and signals corresponding to the contents of said register, said communication control means further comprising means responsive to the receipt of determined coded recharging signals via said communication path for modifying the contents of said register to correspond to an increase in the amount of postage which said meter is authorized to print, said data center comprising means for verifying said coded information signals and in response thereto applying said recharging signals to said path, the improvement comprising the steps of interrupting the interconnection between said meter and said data center upon the application of said coded information signals to said path and before the receipt of recharging signals from said path, and wherein said data center responds to the receipt and verification of said coded information signals for reestablishing the interconnection between said meter and data center.

16. The method of claim 15 wherein said postage meter is at a remote location having a telephone, said communication path comprises a telephonic communication path, further including the steps of applying dialing signals to said path corresponding to the telephone number of said data center, and reestablishing the interconnection by applying dialing signals to said path corresponding the telephone number of said telephone, whereby said meter can be recharged only if it is located at said remote location.

17. The method of claim 16 wherein said control means comprises nonvolatile memory means having stored therein a telephone number corresponding to said remote location, and further including the steps of applying said stored telephone number to said path with said coded signals, and applying dialing signals to said path corresponding to said telephone number for recovering said stored telephone number from said coded signals, and applying said stored telephone number to said path in the form of dialing signals.

18. The method of claim 16 wherein said postage meter further comprises releasable power connector means, and further including the steps of applying operating power thereto via a main supply, and responding to the absence of power at said connector means for a determined time for inhibiting said meter from any further printing of postage, whereby separation of said meter from said remote location prevents the meter from any further printing of posage.

* * * * *